Patented Apr. 20, 1943

2,317,013

UNITED STATES PATENT OFFICE 2,317,013

β-m-METHOXYPHENYLPROPYL BENZYLAMINE

Eugene H. Woodruff, Kalamazoo, Mich., assignor to The Upjohn Company, Kalamazoo, Mich.

No Drawing. Application April 4, 1941, Serial No. 386,862

1 Claim. (Cl. 260—570.9)

This invention relates to improvements in β-m-methoxyphenylpropyl benzylamine.

This invention relates to a new and useful product which is physiologically active for the treatment of asthma and the like. The product is particularly useful because it has a high bronchodilator effect with pressor effect so low that in therapeutic doses it is practically nil.

The objects of this invention are:

First, to produce a new and useful product.

Second, to produce such a product physiologically active as a therapeutic agent for treating asthma which has a very high bronchodilator effect and which has a practically negligible pressor effect.

Third, to provide such a substance of low toxicity.

Fourth, to produce such a product which may be administered orally.

Further objects and advantages will appear from the description to follow. The invention is pointed out in the claim.

My new product may be termed β-m-methoxyphenylpropyl benzylamine. This amine may be prepared as follows:

32.5 grams (0.2 mole) β-m-methoxy phenyl propyl amine, 21 grams (0.2 mole) benzaldehyde and 100 cc. of absolute alcohol were refluxed together for thirty minutes. After removal of the alcohol the residual oil was fractionated. The β-m-methoxy phenyl propyl benzal amine distilled at 207–8° C. at 12 mm. Hg. Yield 49.8 grams or 92 per cent of theoretical.

7.6 grams of the β-m-methoxy phenyl banzal amine thus obtained, one teaspoonful Raney Nickel catalyst and 100 cc. 95 per cent alcohol were placed in a pressure bottle and reduced by means of hydrogen using an Adams reducing apparatus. After one-half hour, the theoretical amount of hydrogen was taken up. The catalyst was removed by filtration and the solvent evaporated. The residual oil β-m-methoxyphenylpropyl benzylamine distilled at 196° C. at 10 mm. Hg.

The hydrochloride prepared from an absolute ethyl alcoholic hydrogen chloride solution and an absolute ether solution of the amine melts when pure at 141–142° C.

The physiological properties of this compound are:

Toxicity _____ 40 mg./kg.
Blood pressure__ Nil
Lung_____ 16 bubbles per minute increase By the Sollman von Oettingen isolated lung technique, this compound when injected in ½ and 1 cc. doses gave an average bronchodilation as shown by an increased flow measured as 16 bubbles per minute. Ephedrine by the same technique and at the same doses showed an average increased flow of 2 bubbles per minute.

Salts of this amine may also be used. Salts of inorganic mineral acids and organic carboxylic acids may be used. Among the available salts are those formed from the following acids: formic, acetic, propionic, butyric, valeric, hexoic, lauric, myristic, palmitic, stearic, oleic, oxalic, succinic, glutaric, adipic, maleic, fumaric, lactic, tartaric, hydrobromic, hydriodic, carbonic, boric, acids of phosphorus, sulfuric, sulfonic, alkylhydrogen sulfuric and nitric. Salts of such weak acids as carbonic may also be employed. In fact, any acid addition salt corresponding to an ammonium salt may be utilized as would be apparent to one skilled in the art as the product of this application may be considered as an ammonia.

Having thus described my invention, what I claim as new and desire to secure by Letters Patent is:

A physiologically active therapeutic agent capable of producing bronchodilator effects comprising essentially a β-m-methoxyphenylpropyl benzylamine of the group consisting of β-m-methoxyphenylpropyl benzylamine and salts thereof.

EUGENE H. WOODRUFF.